United States Patent [19]

Moir

[11] Patent Number: 4,604,526
[45] Date of Patent: Aug. 5, 1986

[54] POSITION DETECTOR

[75] Inventor: Christopher I. Moir, Malvern Link, England

[73] Assignee: Micro Control Technology Limited, Great Britain

[21] Appl. No.: 550,479

[22] Filed: Nov. 9, 1983

[30] Foreign Application Priority Data

Nov. 10, 1982 [GB] United Kingdom ................ 8232096

[51] Int. Cl.⁴ ............................................. G01N 21/86
[52] U.S. Cl. ..................................... 250/561; 33/263; 33/286
[58] Field of Search ............................ 250/231 R, 561; 356/399, 400, 401, 23, 24, 25; 73/455, 655, 656, 662; 33/263, 264, 286, 228

[56] References Cited

U.S. PATENT DOCUMENTS 2,964,849 12/1960 Roccati ................................. 73/455
4,053,227 10/1977 Bodlaj .................................. 356/24
4,465,367 8/1984 Sabatier ............................... 73/455

Primary Examiner—David C. Nelms
Assistant Examiner—James Gatto
Attorney, Agent, or Firm—Ralph R. Rath

[57] ABSTRACT

A detector for checking the symmetry of a helicopter rotor while it is rotating has a scanner (11) which scans vertically a field of view (15) and the view is interrupted by a vertical strip on the blade tip (16). A slot (18) in the strip gives a characteristic signal as at ($L_2$). The position of the signal ($L_2$) in a scanning cycle gives an indication of the height of the blade tip and also the circumferential spacing between blades.

10 Claims, 5 Drawing Figures

POSITION DETECTOR

BACKGROUND OF THE INVENTION

This invention relates to a position detector, for example for detecting the position of a movable object but one example is to detect the vertical position of the tips of rotor blades of a helicopter rotor as they rotate so that any lack of uniformity in the deflection of all the blades in the rotor can be detected and corrected.

Although the invention will be particularly described as applied to that use, it will be appreciated that it can be used for detecting the position of other articles, for example the vertical deflection of the end of a stationary cantilever beam or the deflection of rotor blade tips in a turbine, or components of other rotating machinery.

SUMMARY OF THE INVENTION

The invention has various aspects, but from one point of view can be considered to embody a position detector comprising means defining an elongate field of view and a target which may carry a reference mark and is capable of being in any of a range of positions along the field of view, and a sensor arranged to scan along the field of view.

The target may be fixed to an object for example a rotor blade whose position is to be detected, and the target itself may be elongate parallel with the field of view, which in turn will extend in the general direction of expected deflection. The reference mark can be a line extending transversely to the elongate target and could be a slot in an opaque target so that light can be seen through the slot by the sensor. Again the reference mark could be a highly reflective strip on a non reflective target surface, but that application would require a source of light or other radiation to which the sensor is sensitive for illuminating the reference mark when the target was in the field of view.

The advantage of having a reference mark on the target is that the width of the reference mark and its position along the target can be precisely measured, and that can provide reference information from which the actual deflection of the article carrying the target can be determined. Alternatively the blade itself could act as the target, preferably the trailing edge of the blade, as this would be lower than the leading edge when the pitch of the blade is adjusted for flight conditions.

The means defining the elongate field of view could comprise an elongate lens.

The sensor could consist of a multi-element linear sensor with electronic means for scanning the elements in a scanning cycle.

In the application to a helicopter rotor, a target could be positioned on the tip of each rotor blade, extending in the vertical direction with an elongate slot constituting the reference mark of a known width at a known distance from the end of the target strip, and with the field of view and the sensor extending parallel to the length of the target.

The invention is quite simple because for daylight use it is not necessary to irradiate the target, and the sensor can be coupled to solid state logic circuits capable of giving a direct indication of the amount of deflection of a helicopter rotor blade or other article which information can be updated as it changes. Of course other types of logic circuit could be used if desired.

BRIEF DESCRIPTION OF SEVERAL VIEWS OF DRAWINGS

The invention may be carried into practice in various ways, and one embodiment will now be described by way of example, together with a variation, with reference to the accompanying drawings, in which FIG. 1 is a diagrammatic front elevation of a helicopter using a sensor in accordance with the invention;

DESCRIPTION OF THE PREFERRED EMBODIMENT

The sensor is for providing an indication of the deflection of the individual blades of a rotating helicopter rotor, and also for providing an indication of any circumferential lag or lead of an individual blade.

Figure 1:
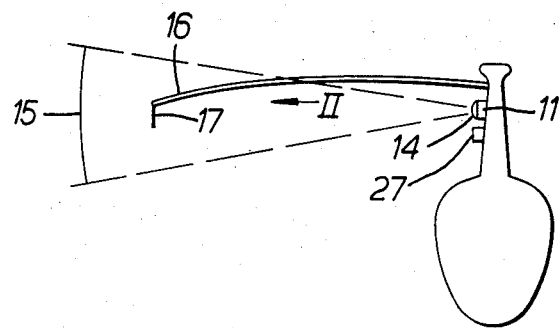
Figure 2:
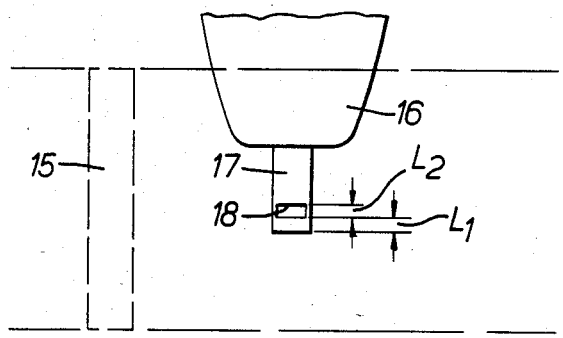
FIG. 2 is a detail to an increased scale of the tip of a helicopter blade as seen in the direction of the arrow II in FIG. 1.

The sensor embodies a charge coupled device (CCD) 11 which comprises a normally vertical line of sensor elements (256 in the example being described) including an integrated circuit embodying a shift register, so that the electrical charge on each element can be transmitted by way of a control 12 (FIG. 3) to a microprocessor 13, as the elements are scanned in a scanning cycle controlled by the shift register. In front of the CCD is a lens 14, which is arranged to focus onto the vertical line of sensor elements, light from a narrow vertical strip field of view indicated generally at 15 in FIGS. 1 and 2. The strip might be about 5 centimeters high at the tip 16 of the helicopter blades, one of which is shown in FIGS. 1 and 2.

The lens inverts the image of the field of view 15 and the elements in the CCD are scanned vertically downwards by the shift register so that the image received is that of a thin vertical slice of background, which will be interrupted regularly by a rotating rotor blade.

For calibration purposes, the tip of each blade carries a depending target strip 17 perhaps 10 centimeters high and 3 centimeters wide having at a known distance 'L' (perhaps equal to one centimeter) up from the lower edge, a horizontal rectangular hole 'L' high and nearly as wide as the target strip 17.

Figure 4:
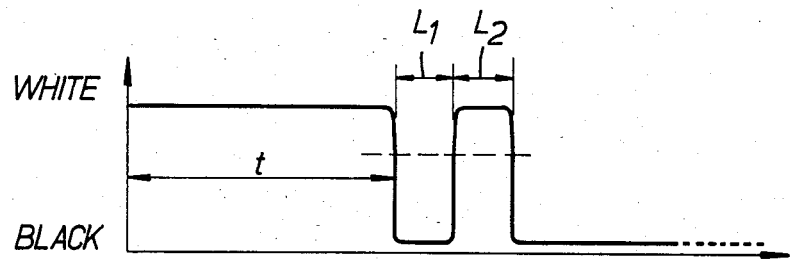
FIGS. 4, and 5 are characteristics which arise during use of the sensor.

The effect will be that during a scan of the CCD while the field of view 15 is interrupted by a blade and its target 17, the signal received by the microprocessor will be as shown in FIG. 4 consisting of a high signal representing peak white for a time 't' corresponding to viewing of the clear background below the target, and then a period 'L', of low signal represented by the obscuring of light by the bottom of the target, then an equal length period '$L_2$' of peak white signal as light is received through the hole 18, and finally a low signal black period until the end of the time 'T' of the scan because of the obscuring of light first by the top part of the target 17 and then by the body of the blade.

It will be appreciated that the time 't' before the black signal shown in FIG. 4 will be a measure of the absolute vertical displacement of the lower edge of the target, and hence of the blade in relation to some reference height. The scanning time for the CCD 11 will be shorter than the time it takes for the blade and target to cross the field of view 15, so that several scans are made during the passage of each blade, the lowest reading being taken as the true blade position. The signals from the various blades can be compared so that any variation in the heights of the individual blade tips can be indicated.

Figure 3:
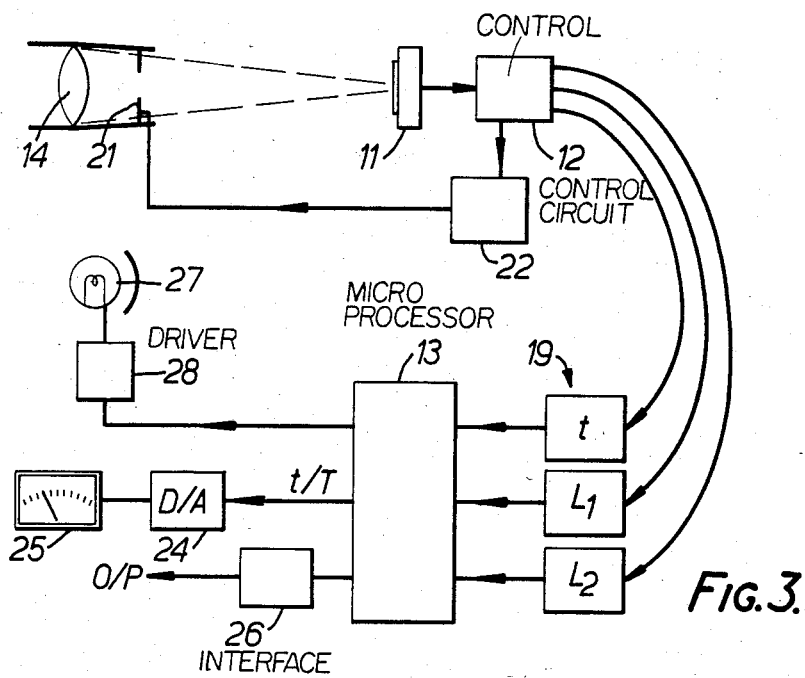
FIG. 3 is a block schematic diagram of the circuit using the sensor of FIG. 1.

The circuit of FIG. 3 includes a number of timing counters 19 used for giving signals representing the quantities 't', '$L_1$', and '$L_2$', as shown in FIG. 4. $L_1$ and $L_2$ correspond to the known equal heights of the lowest opaque portion of the target and the hole 18 respectively, and by averaging those values, compensation can be obtained for any errors introduced by any change in the sensing threshold of the logic caused by different levels of lumination. The height corresponding to 'L' is known, so that 't' can be accurately determined in terms of that known height 'L'. During initial calibration, the blades need not be rotating.

A reference pulse is fed into the circuit of FIG. 3 once per revolution of the rotor, and by relating the signals such as shown in FIG. 4 for each of the rotor blades to that reference pulse, any variation of the circumferential position of any blade from the desired equal circumferential spacing can be indicated even if a variation occurs from revolution to revolution.

A control circuit 22 monitors the peak video output from the CCD sensor, and one output from this is used to control an iris 21 which is part of lens 14. Thus, the peak output from the CCD sensor is maintained for varying light levels.

A second output from the control circuit 22 informs the microprocessor 13 if the light level is too low for satisfactory operation. The microprocessor can then increase the integration time and/or inform the operator that the light level is too low.

An output from the microprocessor representing 't/T' is converted into an analogue signal in a convertor 24 to drive a meter 25 which is conveniently set so that when the meter indicator is at half full scale deflection the image of the hole 18 is in the centre of the field of view 15.

Information from the microprocessor 13 is also sent by way of a serial data interface 26 to a computer which can display the detected information visually.

For use of the system at night, when there is unsufficient background illumination, the target 17 can be replaced by one having instead of the hole 18 a highly reflective strip of the same shape facing the camera, and arranged to reflect illumination from a lamp 27 which can in fact be controlled from the microprocessor 13 through a driver 28 to be illuminated only when a blade is due to enter the field of view 15.

Figure 5:
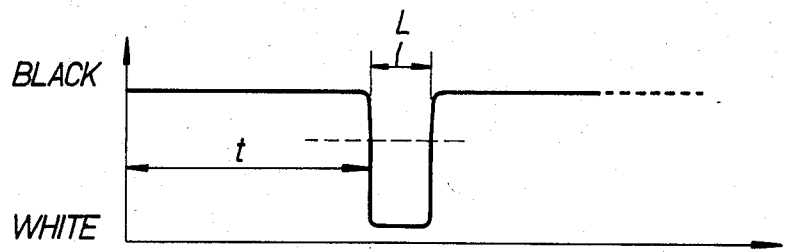

The signal received is inverted and so will appear as shown in FIG. 5 being "black" for most of the cyclic period 'T' but being "peak white" for an interval 'L' corresponding to the reflective strip at the time 't' from the start of the scan.

I claim:

1. A position detector comprising means defining an elongate field of view, for viewing a target which is arranged to cross the field of view in any of a range of positions along the length of the field of view and having a reference part, a sensor in the form of a line of sensitive elements extending parallel with the field of view and positioned to receive an image of the field of view, and electronic means for repeatedly scanning the elements in scanning cycles and for detecting the particular sensitive element which receives the image of the reference part of the target as the target crosses the field of view.

2. A detector as claimed in claim 1, in which the target is fixed to a rotor blade, whose position is to be detected.

3. A detector as claimed in claim 1, in which the target comprises a blade of a helicopter rotor and the reference part is the edge of the blade.

4. A detector as claimed in claim 1, in which the reference part is a slot extending perpendicularly to the length of elongation of the field of view.

5. A detector as claimed in claim 4, in which said reference part is a reflecting line and further including a source of radiation to which the sensor is sensitive for illuminating the reflecting line when the target is in the field of view.

6. A detector as claimed in claim 1, in which the means defining the elongate field of view comprises an elongate lens.

7. A detector as claimed in claim 1, further including computer means connected to receive the output from the sensor and including means for computing the position of the reference part in the field of view.

8. A detector as claimed in claim 7 in combination with a helicopter rotor and having means for generating a reference signal once per rotor revolution, and in which the computer means includes means for computing the circumferential position of each rotor blade in relation to the reference signal.

9. A method of testing a helicopter rotor having blades in which a thin, generally vertical elongate field of view is defined, the rotor is rotated so that the blades in turn cross the vertical field of view, a multi-element sensor extending parallel with the field of view is repeatedly scanned in scanning cycles, and the position of the various blades in the field of view are computed from signals derived during the scanning cycles.

10. A method as claimed in claim 9, in which the scanning cycle is fast in relation to the time taken for a blade to cross the field of view.

* * * * *